(12) United States Patent
Yao (10) Patent No.: US 10,156,677 B1
(45) Date of Patent: Dec. 18, 2018

(54) COMPACT OPTIC DELAY LINES USING DUAL FIBER COLLIMATORS AND ROOF PRISMS

(71) Applicant: General Photonics Corporation, Chino, CA (US)

(72) Inventor: Xiaotian Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 0 days.

(21) Appl. No.: 15/975,715

(22) Filed: May 9, 2018

Related U.S. Application Data (60) Provisional application No. 62/503,925, filed on May 9, 2017.

(51) Int. Cl.
| | |
|---|---|
| *G02B 6/28* | (2006.01) |
| *G02B 6/32* | (2006.01) |
| *G02B 5/126* | (2006.01) |
| *G02B 6/42* | (2006.01) |
| *G02B 6/34* | (2006.01) |
| G02B 6/12 | (2006.01) |
| H04Q 11/00 | (2006.01) |

(52) U.S. Cl.
CPC ........... *G02B 6/2861* (2013.01); *G02B 5/126* (2013.01); *G02B 6/32* (2013.01); *G02B 6/34* (2013.01); *G02B 6/4226* (2013.01); *G02B 2006/12114* (2013.01); *H04Q 2011/002* (2013.01)

(58) Field of Classification Search
CPC ...... G02B 6/2861; G02B 6/34; G02B 6/4226; G02B 5/126; G02B 2006/12114; H04Q 2011/002
See application file for complete search history.

(56) References Cited

U.S. PATENT DOCUMENTS

| | | | | |
|---|---|---|---|---|
| 5,940,418 | A * | 8/1999 | Shields | G02F 1/3534 372/20 |
| 6,636,654 | B2 * | 10/2003 | McGuire, Jr. | G02B 6/356 385/129 |
| 6,813,050 | B2 * | 11/2004 | Chen | G01N 21/4795 250/234 |
| 6,823,102 | B2 * | 11/2004 | Zhao | G02B 6/32 385/15 |
| 6,845,108 | B1 * | 1/2005 | Liu | H01S 3/1109 372/20 |
| 7,068,936 | B2 * | 6/2006 | Pau | H04J 14/086 398/52 |
| 7,224,860 | B2 * | 5/2007 | Zhao | G02F 1/31 385/17 |
| 7,365,858 | B2 * | 4/2008 | Fang-Yen | G01N 21/45 356/489 |

(Continued)

*Primary Examiner* — Andrew Jordan
(74) *Attorney, Agent, or Firm* — Perkins Coie LLP (57) ABSTRACT

Optical designs and techniques for providing compact optical delay lines by using a dual fiber collimator structured to include (1) an input fiber line that receives and guides an input light beam, (2) an output fiber line that guides and exports an output light beam that has an optical delay relative to the input light beam, and (3) a collimating lens placed on one side of end facets of the input and output fiber lines to receive the input light beam from the input fiber line and to output the output beam light to the output fiber line.

15 Claims, 6 Drawing Sheets

(56) References Cited

U.S. PATENT DOCUMENTS

| | | | |
|---|---|---|---|
| 7,557,929 B2* | 7/2009 | Fang-Yen | G01B 9/02072 356/484 |
| 7,603,006 B2* | 10/2009 | Cai | G02B 6/3528 385/16 |
| 8,049,899 B2* | 11/2011 | Waelti | A61B 3/102 356/497 |
| 8,334,982 B2* | 12/2012 | Fang-Yen | A61B 5/1455 356/497 |
| 9,164,242 B1* | 10/2015 | Li | G02B 6/34 |
| 9,507,091 B1* | 11/2016 | Li | G02B 6/34 |
| 9,528,817 B2* | 12/2016 | Fang-Yen | A61B 5/1455 |
| 2004/0013351 A1* | 1/2004 | Zhao | G02B 6/32 385/22 |
| 2004/0021922 A1* | 2/2004 | Chen | G01N 21/4795 359/212.2 |
| 2004/0208555 A1* | 10/2004 | Pau | H04J 14/086 398/56 |
| 2005/0057756 A1* | 3/2005 | Fang-Yen | G01N 21/45 356/497 |
| 2005/0105097 A1* | 5/2005 | Fang-Yen | G01B 9/02072 356/497 |
| 2009/0268209 A1* | 10/2009 | Waelti | A61B 3/102 356/479 |
| 2010/0094135 A1* | 4/2010 | Fang-Yen | G01B 9/02072 600/476 |
| 2013/0107274 A1* | 5/2013 | Vertikov | G01B 9/02004 356/479 |
| 2013/0265585 A1* | 10/2013 | Fang-Yen | G01B 9/02072 356/497 |

\* cited by examiner

COMPACT OPTIC DELAY LINES USING DUAL FIBER COLLIMATORS AND ROOF PRISMS

CROSS-REFERENCE TO RELATED APPLICATION(S)

This patent document claims priority to and the benefits of U.S. Provisional Patent Application No. 62/503,925 entitled COMPACT OPTIC DELAY LINES and filed on May 9, 2017, which is incorporated by reference for all purposes as part of the disclosure of this patent document.

BACKGROUND

This patent document relates to optical devices and techniques for causing optical delays in light.

Optical delay lines are devices that produce desired optical delays in propagation of light and can be operated to adjust signal path delays in light. Optical delay lines can be used in various s applications, including, e.g., optical communication devices/modules, optical sensor devices/systems or other optical instruments. As a specific example, an optical coherence tomography (OCT) system having two interference optical arms for an optical reference beam and an optical sampling beam can implement one or more optical delay lines or devices to cause the relative optical delays between the optical reference and sampling beams.

SUMMARY

This patent document discloses designs and techniques for providing compact optical delay lines.

In one aspect, the disclosed technology can be implemented to provide an optical delay device that includes a device housing and a dual fiber collimator engaged to the device housing and structured to include (1) an input fiber line that receives and guides an input light beam, (2) an output fiber line that guides and exports an output light beam that has an optical delay relative to the input light beam, and (3) a collimating lens placed on one side of end facets of the input and output fiber lines to receive the input light beam from the input fiber line and to output the output beam light to the output fiber line. This device can further include an optical reflector placed inside the device housing and spaced from the dual fiber collimator to receive the input light beam and to reflect the input light beam back as the output light beam; and a roof prism located in optical paths of the input light beam and the output light beam between the optical reflector and the dual fiber collimator to direct the input light beam from the dual fiber collimator towards the optical reflector and to direct the output light beam from the optical reflector towards the dual fiber collimator. In some implementations, a positioning device can be engaged to the optical reflector to move a position of the optical reflector relative to the dual fiber collimator and the roof prism to change a delay in the output light beam.

In another aspect, the disclosed technology can be implemented to provide an optical delay device that includes a device housing and a dual fiber collimator engaged to the device housing and structured to include (1) an input fiber line that receives and guides an input light beam, (2) an output fiber line that guides and exports an output light beam that has an optical delay relative to the input light beam, and (3) a collimating lens placed on one side of end facets of the input and output fiber lines to receive the input light beam from the input fiber line and to output the output beam light to the output fiber line. This device can further include an optical reflector placed inside the device housing and spaced from the dual fiber collimator to receive the input light beam and to reflect the input light beam back as the output light beam; and a roof prism located in optical paths of the input light beam and the output light beam between the optical reflector and the dual fiber collimator to direct the input light beam from the dual fiber collimator towards the optical reflector and to direct the output light beam from the optical reflector towards the dual fiber collimator. An actuator is engaged to cause a relative movement between the optical reflector and the dual fiber collimator to change a delay in the output light beam.

In yet another aspect, the disclosed technology can be implemented to provide a method for causing an adjustable optical delay in light to include using a dual fiber collimator that includes (1) an input fiber line to receive and guide an input light beam to be processed to cause an optical delay, (2) an output fiber line to guide and export an output light beam that has been delayed with an optical delay relative to the input light beam, and (3) a collimating lens placed on one side of end facets of the input and output fiber lines to receive the input light beam from the input fiber line and to output the output beam light to the output fiber line; using an optical reflector spaced from the dual fiber collimator to receive the input light beam from the input fiber line and to reflect the input light beam back with the optical delay as the output light beam into the output fiber line; using a roof prism located in optical paths of the input light beam and the output light beam between the optical reflector and the dual fiber collimator to direct the input light beam from the dual fiber collimator towards the optical reflector and to direct the output light beam from the optical reflector towards the dual fiber collimator; and causing a relative movement between the optical reflector and the dual fiber collimator to change an amount of the optical delay in the output light beam.

The above and other aspects and their implementations are described in greater detail in the drawings, the description and the claims.

DETAILED DESCRIPTION

Various optical delay lines or devices can be constructed in different configurations to meet specific needs for creating optical delays.

Figure 1:
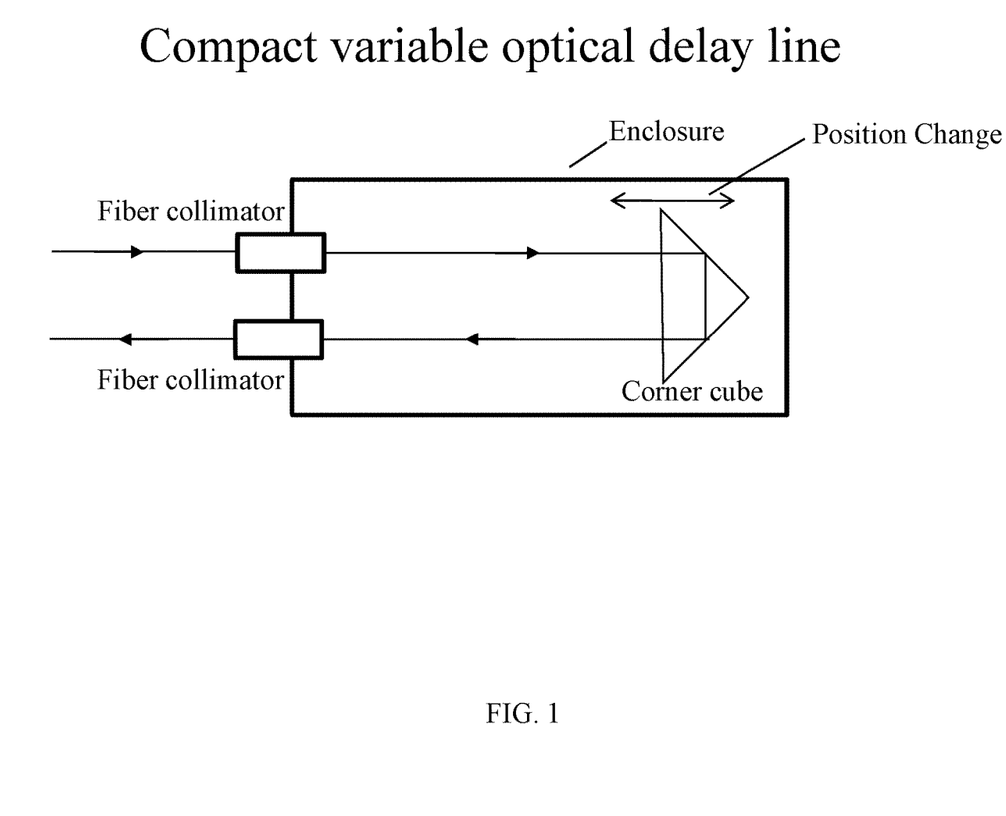
FIG. 1 is an example of a fiber optic variable delay line.

FIG. 1 illustrates one example of a prior art optical delay line in which an input fiber optic collimator collimates the input light signal from a first optical fiber into an input light beam. The light beam then propagates through a distance to incident on to a corner cube retro-reflector. The reflected beam then propagates back to a second fiber collimator to focus the light into a second optical fiber. When the retro-reflector is translated in the direction of the beam, the optical path length of the reflected beam can be adjusted by twice of an adjustment of a distance d of the retro-reflector.

Figure 2:
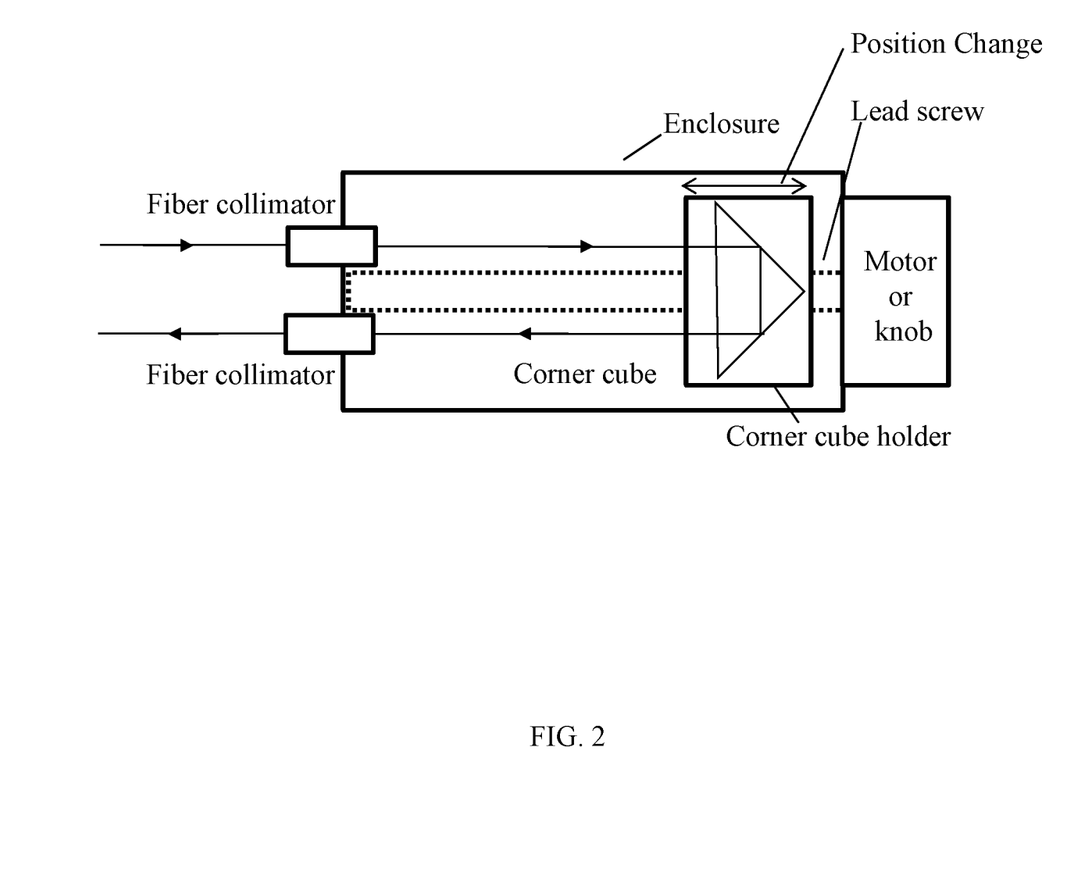
FIG. 2 is another example of a fiber optic variable delay line with a lead screw attached with a corner cube holder with threads to translate a rotating motion into a linear motion for the corner cube.

FIG. 2 further illustrates another example of a prior art optical delay line with a lead screw attached with a corner cube holder with threads to translate a rotating motion into a linear motion for the corner cube. The corner cube receives input light and, upon a reflection, a reflected output light beam is generated with an optical delay. A manual knob or a motor can be used to generate the rotation for moving the corner cube so as to change the optical path length of the reflected output light beam. Other motion generating mechanisms can also be used, such as using a linear magnetic motor or a linear piezo electric motor to generate the linear motion for the corner retro-reflector.

As illustrated in FIGS. 1 and 2, the size of the delay line in such designs can be relatively large due to the inclusion of two fiber collimators and the certain spacing needed for the two collimators in practice. For some applications, especially for those that use multiple delay lines, such as phased array systems, more compact optical delay lines are desirable.

This patent document discloses optical delay lines or devices that are compact in size for various applications.

Figure 3A:
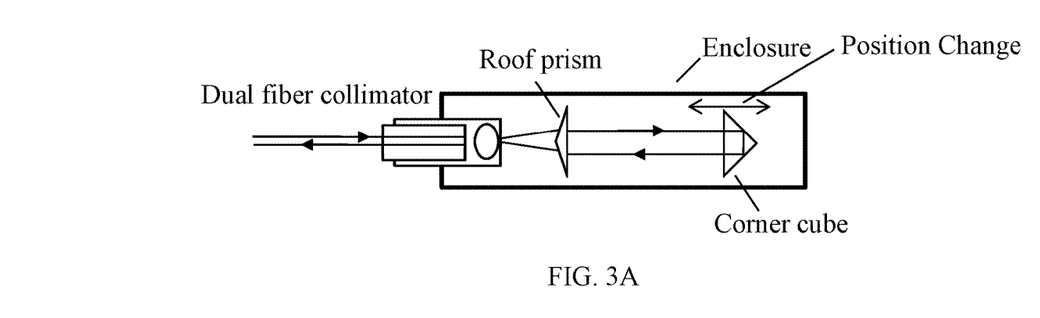
FIG. 3A shows an example of the optical configuration of a first embodiment of a compact fiber optic variable delay line using a dual fiber collimator, a roof prism, and a corner cube based on the disclosed technology in this patent document.
Figure 3B:
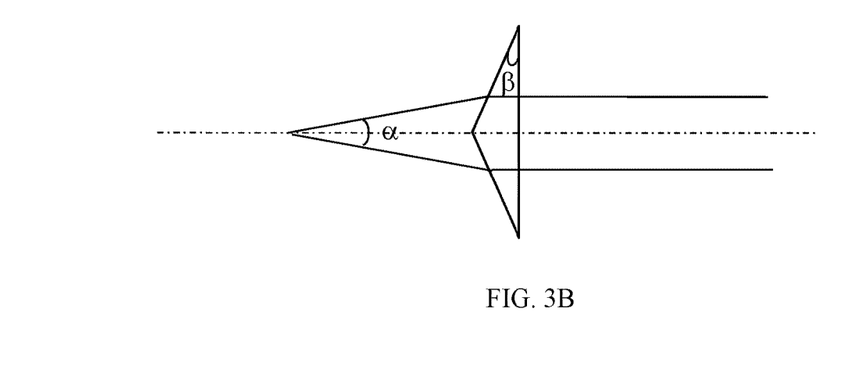
FIG. 3B illustrates an example with the roof prism made from a BK-7 glass with an index of refraction n of 1.5 and with the roof angle $\beta$ at 3.7 degrees to parallelize the two beams with a crossing angle $\alpha$ of 3.7 degrees.

FIGS. 3A and 3B illustrate a first example of a compact optical delay line based on optical reflection of a corner cube of input light to produce an output light with a desired optical delay. As shown in FIG. 3A, a dual fiber collimator is implemented in this example for providing the input and output port of the compact optical delay line. The dual fiber collimator in the illustrated example includes a ferrule to hold two closely placed fibers as the input fiber line (e.g., the upper fiber line) and the output fiber line (e.g., the lower fiber line) and a collimating lens that placed on one side of the terminals of the input and output fiber lines to receive the input light from the input fiber line and to direct output light into the output fiber line. As shown in FIG. 3A, the retro-reflector corner cube is placed to receive the input beam from the input fiber and then reflect the beam back toward the roof prism and finally back to the dual fiber collimator. Under this design, the size of the delay line can be significantly reduced comparing with a design in FIG. 1 or FIG. 2. In some implementations based on FIG. 3, the beam cross angle ($\alpha$) from the dual fiber collimator may be around 3.7 degrees, and the base angle ($\beta$) of the roof prism may also be at 3.7 degrees with a refractive index of 1.5.

More specifically, the tips or end facets of the input and output fibers are placed at or near the focal plane of the lens such that, if two light beams are input from the two fibers toward the collimating lens to produce two collimated beams after passing through the lens, the two collimated beams would be in two propagation directions that form a crossing angle. In some implementations of this design in FIG. 3A, the spacing between the two beams may be about 1 mm and the beam crossing angle may be about 3.7 degrees when using some commercially available dual fiber collimators, although other beam crossing angle can be obtained by changing the focal length of the lens or the spacing between the two fiber tips. In this example in FIG. 3A, a roof prism is placed between the collimating lens and the corner cube in the optical paths of the two optical beams so that the directions of the optical beam from the dual fiber collimator towards the corner cube and the reflected optical beam from the corner cube towards the dual fiber collimator can be parallel to each other. For example, the roof prism can be made from a BK-7 glass with an index of refraction n of 1.5 and with the roof angle $\beta$ at 3.7 degrees to parallelize the two beams with a crossing angle $\alpha$ of 3.7 degrees, as illustrated in FIG. 3B. In general, the roof $\beta$ angle can be chosen as $\beta=\alpha/[2(n-1)]$. The collimating lens in the dual fiber collimator focuses the light reflected back from the corner cube into the output fiber facet.

The compact optical delay line in FIG. 3A can be an adjustable delay line by using an actuator to move the position of the retro-reflector corner cube along the direction of the beam propagation, thus adjusting the amount of the optical delay. Different optical path delays can be obtained by moving the corner cube to different positions.

As illustrated in FIG. 3A, a device housing can be provided to provide an enclosure in which the device components can be placed, including the actuator or motor that moves the corner cube.

Figure 4:
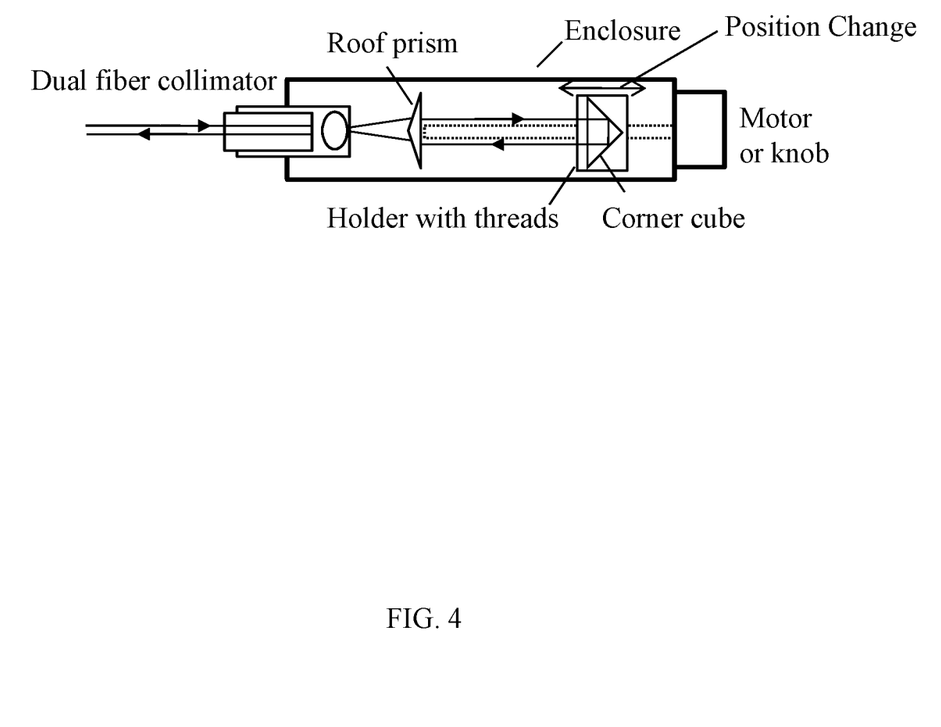
FIG. 4 shows an example of adding some basic mechanics of the first embodiment of a compact fiber optic variable delay line using a dual fiber collimator, a roof prism, and a corner cube based on the disclosed technology in this patent document.

FIG. 4 illustrates additional details of the example of the compact fiber of FIG. 3A. The corner cube is affixed on to a holder with threads and a lead screw threads through the holder to move the corner cube back and forth in response to rotation. A knob or a motor can be used to generate the rotational motion for moving the corner tube. Other motion generating mechanisms can also be used, such as using a linear magnetic motor or a linear piezo electric motor to generate the linear motion for the corner retro-reflector.

Figure 5A:
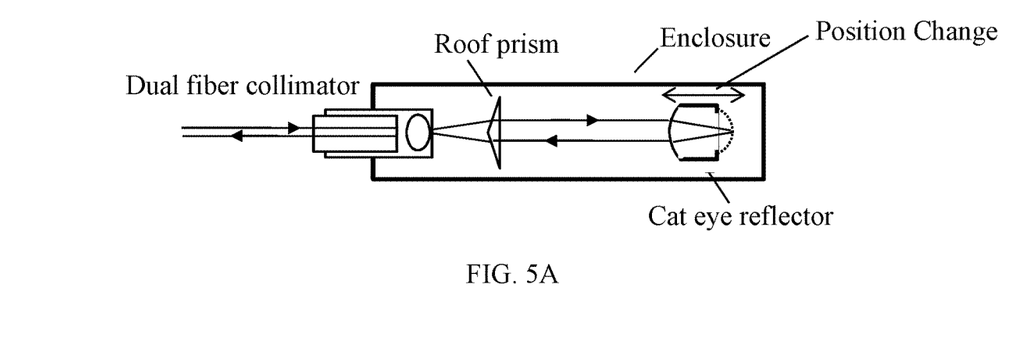
FIG. 5A shows an example of the optical configuration of a second embodiment of a compact fiber optic variable delay line using a dual fiber collimator, a roof prism, and a cat eye reflector based on the disclosed technology in this patent document.
Figure 5B:
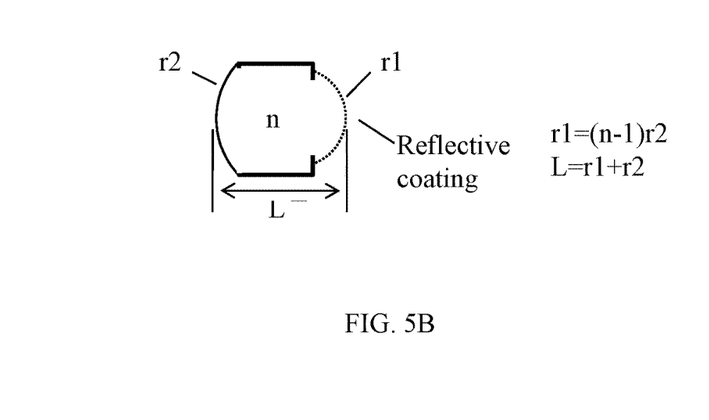
FIG. 5B shows an example of a cat eye reflector, where the radium of curvature of the first surface is half of that of the second surface if n is 1.5.

FIGS. 5A and 5B show another example of a compact optical delay line. FIG. 5A illustrates the optical configuration using a dual fiber collimator, a roof prism, and a cat eye reflector. Similar to the design in FIGS. 3A and 4, the size of the delay line in FIGS. 5A and 5B can be significantly reduced in comparison with other optical delay line designs. The size of the delay line can be reduced with this design relative to the design in FIG. 1 or 2. In implementations, the beam cross angle from the dual fiber collimator may be around 3.7 degrees, and the base angle of the roof prism may also be around 3.7 degrees.

FIG. 5B illustrates the construction of an example of the cat eye reflector used in FIG. 5A, where the radium of curvature of the first surface is half of that of the second surface if n is 1.5. The cat eye reflector has two spherical surfaces, with the radius of curvatures r1, r2 and length L satisfying the following relations: $r1=(n-1)r2$, $L=r1+r2$, where n is the refractive index of the material of the reflector. The back surface of the cat eye reflector is coated with a high reflecting material, such as silver, gold, aluminum or multi-layer dielectrics.

Figure 6:
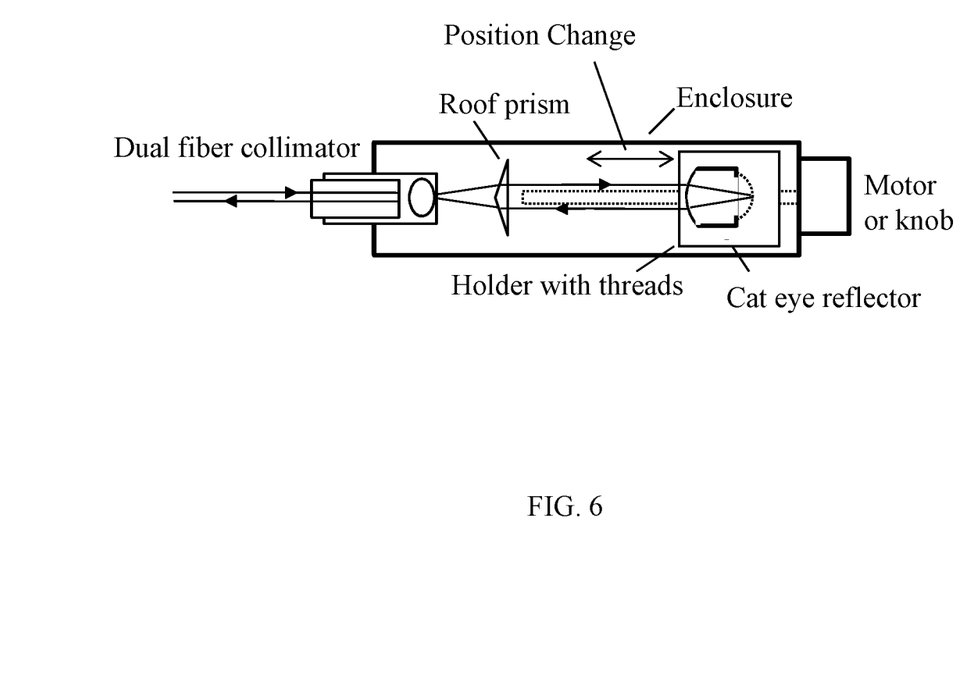
FIG. 6 shows an example of adding the basic mechanics of the second embodiment of a compact fiber optic variable delay line using a dual fiber collimator, a roof prism, and a cat eye reflector based on the disclosed technology in this patent document.

FIG. 6 illustrates additional details of the example of the compact fiber optic variable delay line in FIG. 5A using a dual fiber collimator, a roof prism, and a cat eye reflector. The cat eye reflector is affixed on to a holder with threads and a lead screw threads through the holder to move the corner cube back and forth in response to rotation. A knob or a motor can be used to generate the rotational motion for moving the corner tube. Other motion generating mechanisms can also be used, such as using a linear magnetic motor or a linear piezo electric motor to generate the linear motion for the cat eye retro-reflector.

While this patent document contains many specifics, these should not be construed as limitations on the scope of any disclosed technology or of what may be claimed, but rather as descriptions of features that may be specific to particular embodiments of particular disclosed technology. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Only a few implementations and examples are described and other implementations, enhancements and variations can be made based on what is described and illustrated in this patent document.

What is claimed is:

1. An optical delay device, comprising:
   a device housing;
   a dual fiber collimator engaged to the device housing and structured to include (1) an input fiber line that receives and guides an input light beam, (2) an output fiber line that guides and exports an output light beam that has an optical delay relative to the input light beam, and (3) a collimating lens placed on one side of end facets of the input and output fiber lines to receive the input light beam from the input fiber line and to output the output beam light to the output fiber line;
   an optical reflector placed inside the device housing and spaced from the dual fiber collimator to receive the input light beam and to reflect the input light beam back as the output light beam; and
   a roof prism located in optical paths of the input light beam and the output light beam between the optical reflector and the dual fiber collimator to direct the input light beam from the dual fiber collimator towards the optical reflector and to direct the output light beam from the optical reflector towards the dual fiber collimator.

2. The device as in claim 1, further comprising:
   a positioning device engaged to the optical reflector to move a position of the optical reflector relative to the dual fiber collimator and the roof prism to change a delay in the output light beam.

3. The device as in claim 2, wherein:
   the positioning device includes a motor that causes the optical reflector to move in position.

4. The device as in claim 2, wherein:
   the positioning device includes a manually operated device to cause the optical reflector to move in position by a manual operation of a person.

5. The device as in claim 1, wherein:
   the optical reflector includes a corner cube to cause retro reflection of the input light beam to produce the output light beam.

6. The device as in claim 1, wherein:
   the optical reflector includes a cat eye reflector to cause retro reflection of the input light beam to produce the output light beam.

7. An optical delay device, comprising:
   a device housing;
   a dual fiber collimator engaged to the device housing and structured to include (1) an input fiber line that receives and guides an input light beam, (2) an output fiber line that guides and exports an output light beam that has an optical delay relative to the input light beam, and (3) a collimating lens placed on one side of end facets of the input and output fiber lines to receive the input light beam from the input fiber line and to output the output beam light to the output fiber line;
   an optical reflector placed inside the device housing and spaced from the dual fiber collimator to receive the input light beam and to reflect the input light beam back as the output light beam;
   a roof prism located in optical paths of the input light beam and the output light beam between the optical reflector and the dual fiber collimator to direct the input light beam from the dual fiber collimator towards the optical reflector and to direct the output light beam from the optical reflector towards the dual fiber collimator; and
   an actuator engaged to cause a relative movement between the optical reflector and the dual fiber collimator to change a delay in the output light beam.

8. The device as in claim 7, wherein:
   the optical reflector includes a corner cube to cause retro reflection of the input light beam to produce the output light beam.

9. The device as in claim 7, wherein:
   the optical reflector includes a cat eye reflector to cause retro reflection of the input light beam to produce the output light beam.

10. The device as in claim 7, further comprising:
    the actuator is a motorized actuator engaged to the optical reflector to move a position of the optical reflector relative to the dual fiber collimator.

11. A method for causing an adjustable optical delay in light, comprising:
    using a dual fiber collimator that includes (1) an input fiber line to receive and guide an input light beam to be processed to cause an optical delay, (2) an output fiber line to guide and export an output light beam that has been delayed with an optical delay relative to the input light beam, and (3) a collimating lens placed on one side of end facets of the input and output fiber lines to receive the input light beam from the input fiber line and to output the output beam light to the output fiber line;
    using an optical reflector spaced from the dual fiber collimator to receive the input light beam from the input fiber line and to reflect the input light beam back with the optical delay as the output light beam into the output fiber line;
    using a roof prism located in optical paths of the input light beam and the output light beam between the optical reflector and the dual fiber collimator to direct the input light beam from the dual fiber collimator towards the optical reflector and to direct the output light beam from the optical reflector towards the dual fiber collimator; and causing a relative movement between the optical reflector and the dual fiber collimator to change an amount of the optical delay in the output light beam.

12. The method as in claim 11, comprising:
using a corner cube as the optical reflector to cause retro reflection of the input light beam to produce the output light beam.

13. The method as in claim 11, comprising:
using a cat eye reflector the optical reflector to cause retro reflection of the input light beam to produce the output light beam.

14. The method as in claim 11, comprising:
deploying an assembly of the dual fiber collimator, the optical reflector and the roof prism in each of different optical delay lines in a system.

15. The method as in claim 11, wherein the system includes a phased array systems.

* * * * *